United States Patent [19]

Applin

[11] 3,849,771

[45] Nov. 19, 1974

[54] LIQUID LEVEL ALARM

[76] Inventor: Ronald Applin, 6219 Esplanade, Playa Del Rey, Calif. 90291

[22] Filed: Jan. 24, 1973

[21] Appl. No.: 326,562

[52] U.S. Cl............ 340/245, 200/84 C, 340/244 A
[51] Int. Cl. .......................................... G08b 21/00
[58] Field of Search........... 340/245, 244; 200/84 C; 73/308

[56] References Cited
UNITED STATES PATENTS
3,633,193   1/1972   Milo.................................. 340/245

FOREIGN PATENTS OR APPLICATIONS
264,327   4/1929   Italy................................... 340/245

Primary Examiner—John W. Caldwell
Assistant Examiner—Daniel Myer

[57] ABSTRACT

A portable self-contained liquid level alarm for monitoring the liquid level in swimming pools, bath tubs or the like. The alarm hangs over the rim of the monitored vessel and an audible alarm sounds when a float having a magnet attached rises to actuate a prepositioned magnetic reed switch. The magnetic reed switch is positioned manually to set the alarm level.

5 Claims, 5 Drawing Figures

PATENTED NOV 19 1974    3,849,771

3,849,771

LIQUID LEVEL ALARM

BACKGROUND OF THE INVENTION

1. Field of the Invention

This invention relates to high liquid level alarm devices.

2. Prior Art

The prior art contains many devices useful for sounding an alarm in the event that the liquid level in a fluid vessel exceeds a certain point, however, these are generally relatively complicated devices intended for permanent installation and not adapted to having the set point easily and quickly changed to suit the purpose at hand. The present invention is self-contained, portable and easily installed. Installation and adjustment requires only a few seconds.

SUMMARY OF THE INVENTION

The liquid level alarm of this invention hooks over the rim of the vessel being monitored and emits an audible buzzer alarm when the liquid in the vessel rises to or above the set point of the alarm. A float having a permanent magnet attached on its top portion is held loosely in a cage and floats on top of the liquid. When the liquid level reaches the desired alarm level, the float is near the top of the cage and the permanent magnet actuates a magnetic reed switch located above the top of the cage. A set of batteries and a buzzer are included within the alarm structure in series with the reed switch so that when the reed switch is closed the buzzer sounds indicating that the liquid level has reached the alarm point.

The cage is manually adjustable allowing the set point of the alarm to be adjusted as desired.

It is an object of the present invention to provide a self-contained portable alarm to warn of high liquid levels in open vessels.

It is a further object of this invention to provide a liquid level alarm which requires essentially no installation.

Figure 1:
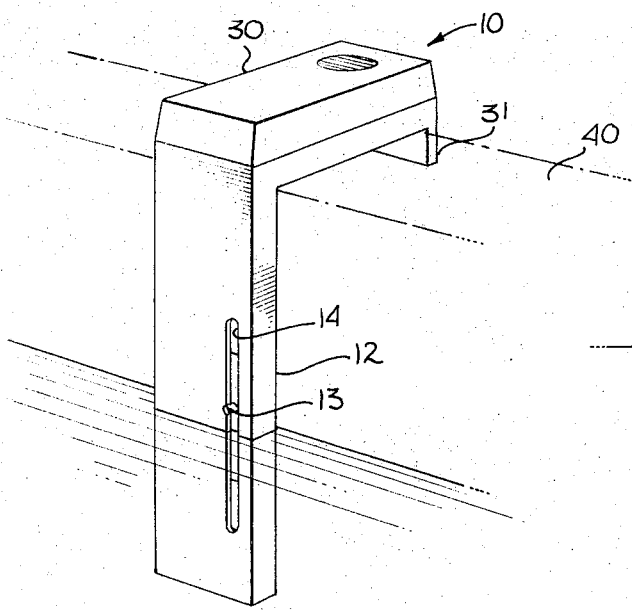
FIG. 1 is a perspective view of the alarm of this invention shown hanging over the rim of an open liquid vessel being monitored.
Figure 2:
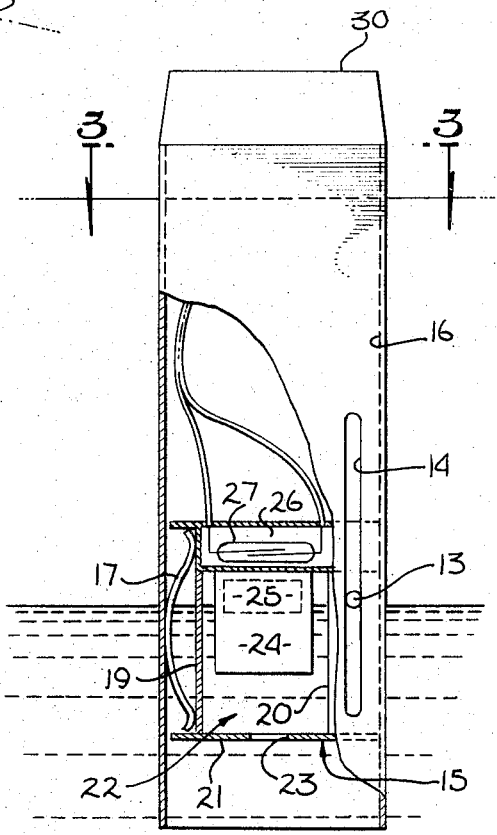
FIG. 2 is a partly sectioned face view of the alarm.
Figure 3:
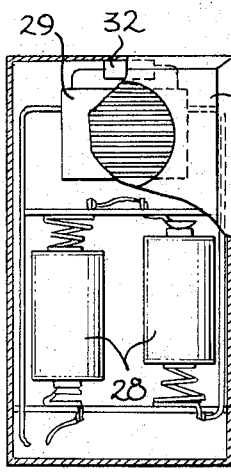
FIG. 3 is a partly sectioned top view of the alarm, the sectioned portion being taken at section 3—3 of FIG. 2.
Figure 4:
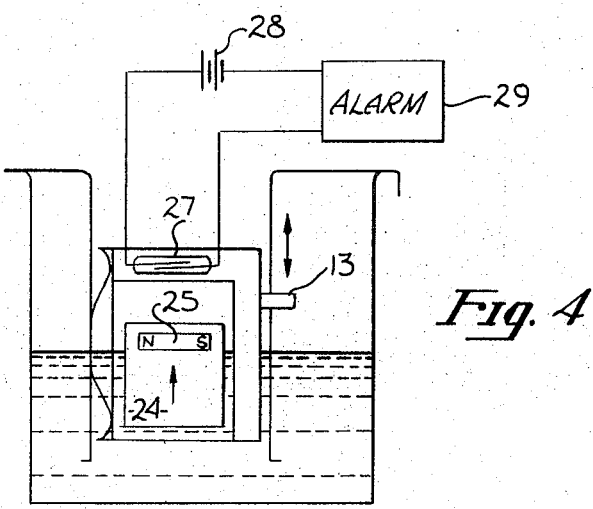
FIG. 4 is a schematic representation of the operating portions of the alarm.

Referring now to the drawings, where the water level alarm device of this invention, indicated generally by the numeral 10 in FIG. 1, is shown in position hanging over the rim of a water vessel being monitored. The alarm is comprised of a vertical rectangular tube section 12 which contains the sensing elements, a horizontal section 30 which contians the power source and an audible signalling device and an overhanging lip 31 which prevents the alarm from being dislodged from its position over the rim of the monitored vessel.

The vertical tube section 12 has an open bottom so that as the water level in the vessel rises, the level within the tube is the same as the level surrounding the tube. Within the vertical tube 12 is a float cage 15 to which an adjusting pin 13 is fastened. The adjusting pin 13 projects through a slot 14 in the vertical tube section allowing the set point of the alarm to be adjusted as required. The cage 15 is free to move up and down within the tube but some force on pin 13 is required to accomplish the motion inasmuch as the cage is pressed against the side 16 of tube 12 by the action of leaf spring 17. The frictional force thereby generated prevents cage 15 from moving within the vertical member unless the casing is purposely moved by pushing on pin 13.

The lower portion of cage 15 is comprised of vertical members 19 and 20 and horizontal member 21 which form a cavity 22 within the cage. The members 19, 20 and 21 are a loose fit in the tube 12 so that water can flow freely around them into the cavity 22. A hole 23 in member 21 aids the flow into the cavity. A float 24 containing a permanent magnet 25 is positioned within the cavity 22 and is free to move therein. The float is made of a material which is lighter than water and impervious thereto so that it will float on the surface. In the top section 26 of casing 15 is a magnetic switch 27. The switch 27 is so positioned that when magnet 25 is close to the top of cavity 22, the switch will actuate. Thus a rising water level in tube 12 will cause float 24 to rise until magnet 25 approaches switch 27 causing actuation. The precise water level needed for actuation is adjusted by raising or lowering the position of casing 15 within tube 12.

The switch 27 is connected in series with batteries 28 contained in the horizontal section 30 of the alarm to a buzzer or other alarm device 29.

In operation, the alarm of this invention is merely hung over the rim of the vessel to be monitored and the position of casing 15 adjusted to the desired set point by manipulation of pin 13. The float 24 will rest on bottom member 21 as long as the liquid level in the vessel is low but as the level approaches the set point, the float will rise and when the set point is reached magnet 25 will be close enough to switch 27 to cause actuation and buzzer 29 will sound. When the liquid level falls again, float 24 will drop, switch 27 will open and the alarm will cease.

Figure 5:
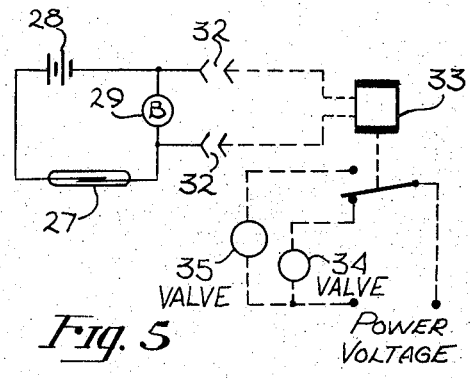
FIG. 5 is a schematic diagram of the liquid level alarm showing its use with an external circuit for control of liquid level.

The alarm may be connected to an external circuit to automatically activate filling and/or drain functions or an external bell, in response to liquid level. A means for accomplishing this is illustrated in FIG. 5 where the alarm as previously described is shown with a receptacle 32 connected across the buzzer 29. A relay 33, located remotely and connected to the receptacle 32, will be energized when float 24 rises to the level which causes magnetic switch 27 to close. Numerals 34 and 35 represent filling and drain pumps or valves, respectively, which, it can be seen, are activated as required to maintain the liquid level near the set point. It is not necessary that both filling and drain functions be utilized, many applications requiring only one or the other, but both are shown to illustrate the versatility of the invented liquid level alarm.

I claim:

1. A liquid level alarm which comprises:
   a. a hollow tubular member, said tubular member having openings therein whereby when said tubular member is partially immersed in liquid, the liquid level within said tubular member will be substantially the same as the liquid level surrounding said member;
b. a hook on said tubular member whereby said tubular member can be supported substantially vertically on the rim of an open vessel;
c. a cage member slideably positioned within said hollow tubular member;
d. a magnetic reed switch mounted on the top portion of said cage member;
e. a float within said cage member;
f. a permanent magnet secured to said float whereby when said float rises in said cage said magnetic reed switch will be actuated.

2. A liquid level alarm as recited in claim 1 and further including a spring member between said cage and said tubular member whereby said cage will be urged against said tubular member and thereby supported by frictional forces.

3. A liquid level alarm as recited in claim 2 wherein said tubular member is slotted and further including an adjusting pin attached to said cage and projecting through said slot whereby the position of said cage within said tubular member can be adjusted by manipulating said pin.

4. A liquid level alarm as recited in claim 3 and further including a battery power source and a buzzer, said battery and said buzzer being connected in series with said magnetic reed switch.

5. A liquid level alarm as recited in claim 3 and further including an electrical receptacle mounted on said tubular member and coupled to said reed switch.

* * * * *